United States Patent
Schmidt et al.

[11] Patent Number: 6,148,504
[45] Date of Patent: Nov. 21, 2000

[54] OPERATOR SAFETY DEVICE FOR ATTACHING APPARATUS

[75] Inventors: Volker Schmidt, Lexington; James E. Linville, Paris, both of Ky.

[73] Assignee: Eastlex Machine Corporation, Lexington, Ky.

[21] Appl. No.: 08/771,981

[22] Filed: Dec. 23, 1996

[51] Int. Cl.[7] .................................................. B23Q 15/20
[52] U.S. Cl. ................................ 29/708; 72/21.3; 83/58; 83/DIG. 1; 192/130; 192/134; 100/53
[58] Field of Search ............................... 29/708; 192/130, 192/134; 72/21.3; 83/58, DIG. 1; 100/53

[56] References Cited

U.S. PATENT DOCUMENTS

| | | | |
|---|---|---|---|
| 2,171,467 | 8/1939 | Zeruneith | 192/134 |
| 4,391,358 | 7/1983 | Haeger | 29/708 X |
| 4,586,248 | 5/1986 | Ho | 29/708 |
| 4,694,671 | 9/1987 | Downham | 29/708 X |
| 5,297,705 | 3/1994 | Schmidt | 223/46 |
| 5,319,848 | 6/1994 | Schmidt et al. | 29/787 |
| 5,592,733 | 1/1997 | Wareham | 29/708 |
| 5,802,704 | 9/1998 | Woody | 29/708 |

*Primary Examiner*—P. W. Echols
*Attorney, Agent, or Firm*—Frank C. Leach, Jr.

[57] ABSTRACT

A cycle of operation of an attaching apparatus begins with determining whether an operator's extremity is in an area in which it can be struck by a downwardly moving ram during attachment of two fasteners to each other and to a material therebetween. If it is determined that the operator's extremity is not in the area in which it can be struck by the downwardly moving ram, the remainder of the cycle of operation is completed. If it is determined that the operator's extremity is in the area in which it can be struck by the downwardly moving ram, the cycle of operation must begin again.

17 Claims, 8 Drawing Sheets

OPERATOR SAFETY DEVICE FOR ATTACHING APPARATUS

This invention relates to an operator safety device for an attaching apparatus and, more particularly, to an operator safety device for an attaching apparatus in which two fastener elements are attached to each other and to a material therebetween.

Each of British Patent Specification 1,523,596 to Lovett et al and U.S. Pat. No. 5,297,705 to Erich A. Schmidt includes an operator safety device for an attaching apparatus. Lovett et al has a safety guard movable outside of the path of motion of the fasteners towards each other. This results in a very time consuming cycle of operation so that the number of cycles of operation produced in a specific time period is significantly decreased by the use of the safety guard in Lovett et al.

The aforesaid Schmidt patent uses a safety device in which a cycle of operation cannot occur if an operator's extremity is in an area in which it can be struck by a powered portion of the attaching apparatus. When this occurs, the time for beginning another cycle of operation is significantly increased.

The safety device of the present invention overcomes the foregoing problems of a safety device increasing the time for a cycle of operation of the attaching apparatus. The safety device of the present invention uses a portion of a cycle of operation to insure that the operator has no extremity in an area in which the extremity may be struck by any powered moving portion of the attaching apparatus. Thus, when the operator has no extremity in a danger or injury area, a cycle of operation is completed in the same time period as if there had been no determination of whether an operator's extremity is in a danger or injury area.

In comparison, the cycle of operation in the aforesaid Schmidt patent is increased each time because there is motion of the safety sensing device from a home position to a detecting position before a cycle of operation begins. Accordingly, the safety device of the present invention checks on the safety of the operator without any loss of cycle time.

The present invention accomplishes this reduction in the time for a cycle of operation, as previously mentioned, by using a part of a total time period of a cycle of operation for determining if the operator has an extremity in a danger or injury area. If not, then the cycle of operation continues and is completed in the same period of time as if there had been no such determination. However, if there is an extremity of the operator in the danger or injury area, the operator may recycle for another cycle of operation very quickly and lose only the time portion of a cycle of operation in which determination is made that the operator has an extremity in the danger or injury area.

An object of this invention is to provide a safety device for an attaching apparatus in which there is no delay in each cycle of operation in which the cycle of operation is completed after it has been determined that there is no extremity of the operator in a danger or injury area.

Other objects of this invention will be readily perceived from the following description, claims, and drawings.

This invention relates to an attaching apparatus for attaching first and second mating fastener elements to material at a setting station including support means and ram means at the setting station. First disposing means disposes a first fastener element at the setting station in a specific orientation for engagement by one of the support means and the ram means, and second disposing means disposes a second fastener element at the setting station in a specific orientation for engagement by the other of the support means and the ram means. Moving means creates relative movement between the support means and the ram means to attach the first fastener element and the second fastener element to each other at the setting station. Activation control means controls activation of each of the ram means and the support means by the moving means during a cycle of operation of the attaching apparatus. Control preventing means prevents the moving means from moving the ram means into an area in which an extremity of an operator of the attaching apparatus will be struck by the ram means when the extremity is in the area in which the extremity will be struck by the ram means during movement of the ram means. The control preventing means includes determining means for determining in an initial portion of each cycle of operation if an extremity of an operator of the attaching apparatus will be struck by the ram means when the extremity is in the area in which the extremity will be struck by the ram means during movement of the ram means. The control preventing means also includes stopping means for stopping the cycle of operation before its completion after it is determined by the determining means that the operator's extremity is in the area in which the extremity will be struck by the ram means during movement of the ram means with the activation control means remaining in the position to which it has been moved prior to the cycle of operation being stopped before its completion by the stopping means.

This invention also relates to an attaching apparatus for attaching first and second mating fastener elements to material at a setting station including support means and ram means at the setting station. First disposing means disposes a first fastener element at the setting station in a specific orientation for engagement by one of the support means and the ram means, and second disposing means disposes a second fastener element at the setting station in a specific orientation for engagement by the other of the support means and the ram means. Moving means creates relative movement between the support means and the ram means each other to attach the first fastener element and the second fastener element to at the setting station.

Activation control means controls activation of each of the ram means and the support means by the moving means during a cycle of operation of the attaching apparatus. Control preventing means prevents the moving means from moving the ram means into an area in which an extremity of an operator of the attaching apparatus will be struck by the ram means when the operator has an extremity in the area in which the extremity will be struck by the ram means during movement of the ram means. The control preventing means includes vertically movable engaging means for engaging an operator's extremity when the extremity is disposed in the area in which the extremity will be struck by the ram means during movement of the ram means, causing means for causing movement of the vertically movable engaging means away from its home position at the start of each cycle of operation of the attaching apparatus to a detecting position to detect whether an extremity of the operator is in the area in which the extremity will be struck by the ram means during movement of the ram means, return means for returning the vertically movable engaging means to its home position in which the vertically movable engaging means will not engage an operator's extremity when the extremity is disposed in the area in which the extremity will be struck by the ram means during movement of the ram means, first preventing means for preventing the moving means power source from moving the ram means into the area in which the extremity will be struck by the ram means if the vertically movable engaging means engages an extremity of the operator in the area in which the extremity will be struck by the ram means during movement of the ram means, and rendering means for rendering the first preventing means ineffectively only after the first preventing means is effective to stop the cycle of operation before it is completed until the vertically movable engaging means is returned to its home position by the return means and another cycle of operation is started and the vertically movable engaging means does not engage an extremity of the operator in the area in which the extremity will be struck by the ram means during movement of the ram means.

This invention further relates to an attaching apparatus for attaching first and second mating fastener elements to material at a setting station including support means and ram means at the setting station, first disposing means for disposing a first fastener element at the setting station in a specific orientation for engagement by one of the support means and the ram means, second disposing means for disposing a second fastener element at the setting station in a specific orientation for engagement by the other of the support means and the ram means, and moving means for creating relative movement between the support means and the ram means to attach the first fastener element and the second fastener element to each other at the setting station. The moving means includes a driving means and rotatable means driven by the driving means for creating relative movement between the support means and the ram means. Selective connecting means selectively connects the driving means to the rotatable means to start a cycle of operation of the attaching apparatus. The selective connecting means includes first holding means for holding the rotatable means at its home position, means for releasing the first holding means when a cycle of operation of the attaching apparatus is started, second holding means for holding the rotatable means at a position advanced from the home position after the releasing means is effective if an operator's, extremity is in an area in which the operator's extremity will be struck by the ram means when the ram means is moved into the area in the operator's extremity will be struck by the ram means, and means for rendering the second holding means ineffective in the next cycle of operation only if no operator's extremity is in an area in which the operator's extremity will be struck by the ram means when the ram means is moved into the area in which the operator's extremity will be struck by the ram means.

The attached drawings illustrate a preferred embodiment of the invention, in which.

Figures 1, 1A:
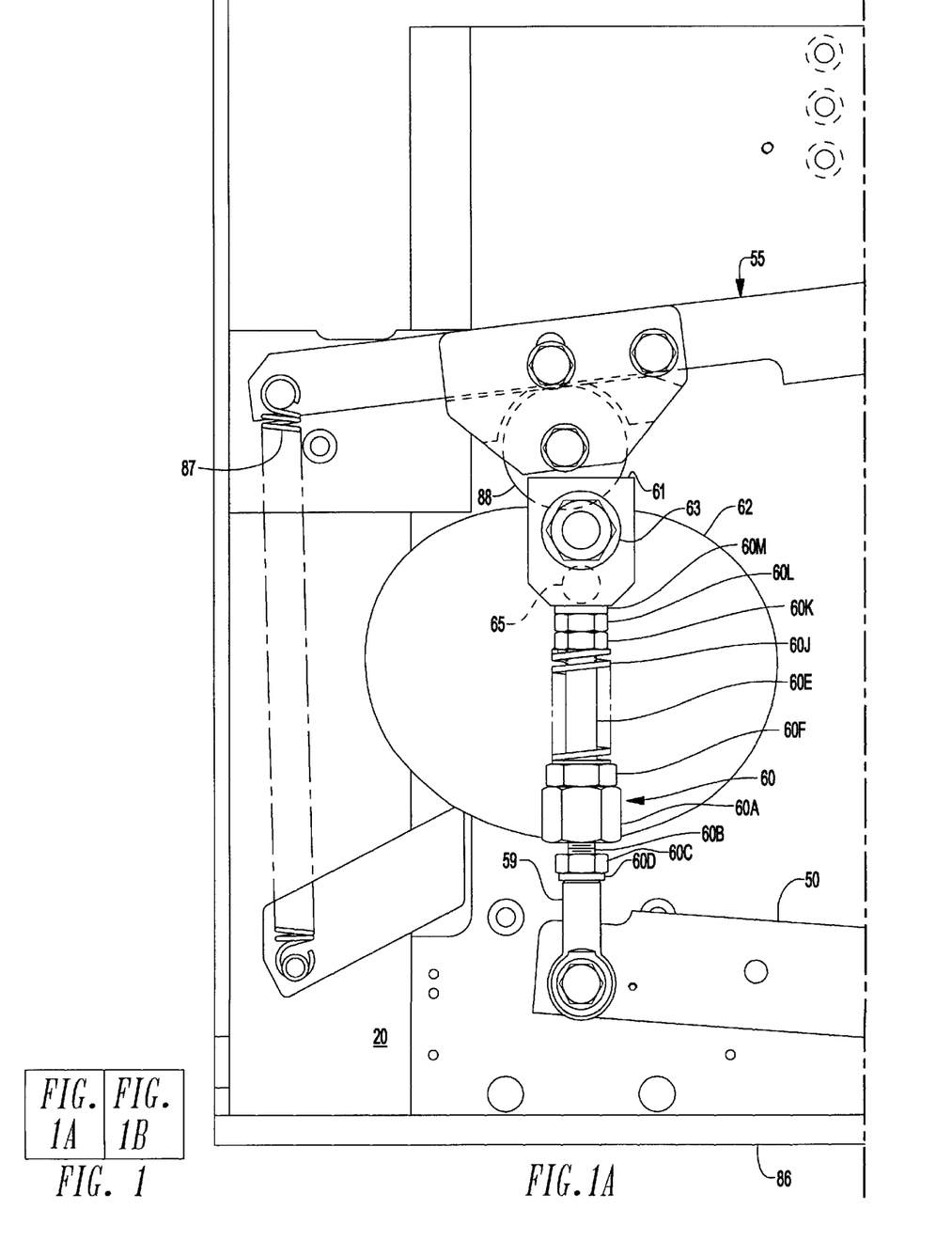
FIG. 1 is a block diagram showing the relationship of FIGS. 1A and 1B.
FIG. 1A is a side elevational view of a portion of an attaching apparatus with which the safety device of the present invention is to be used.
Figure 1B:
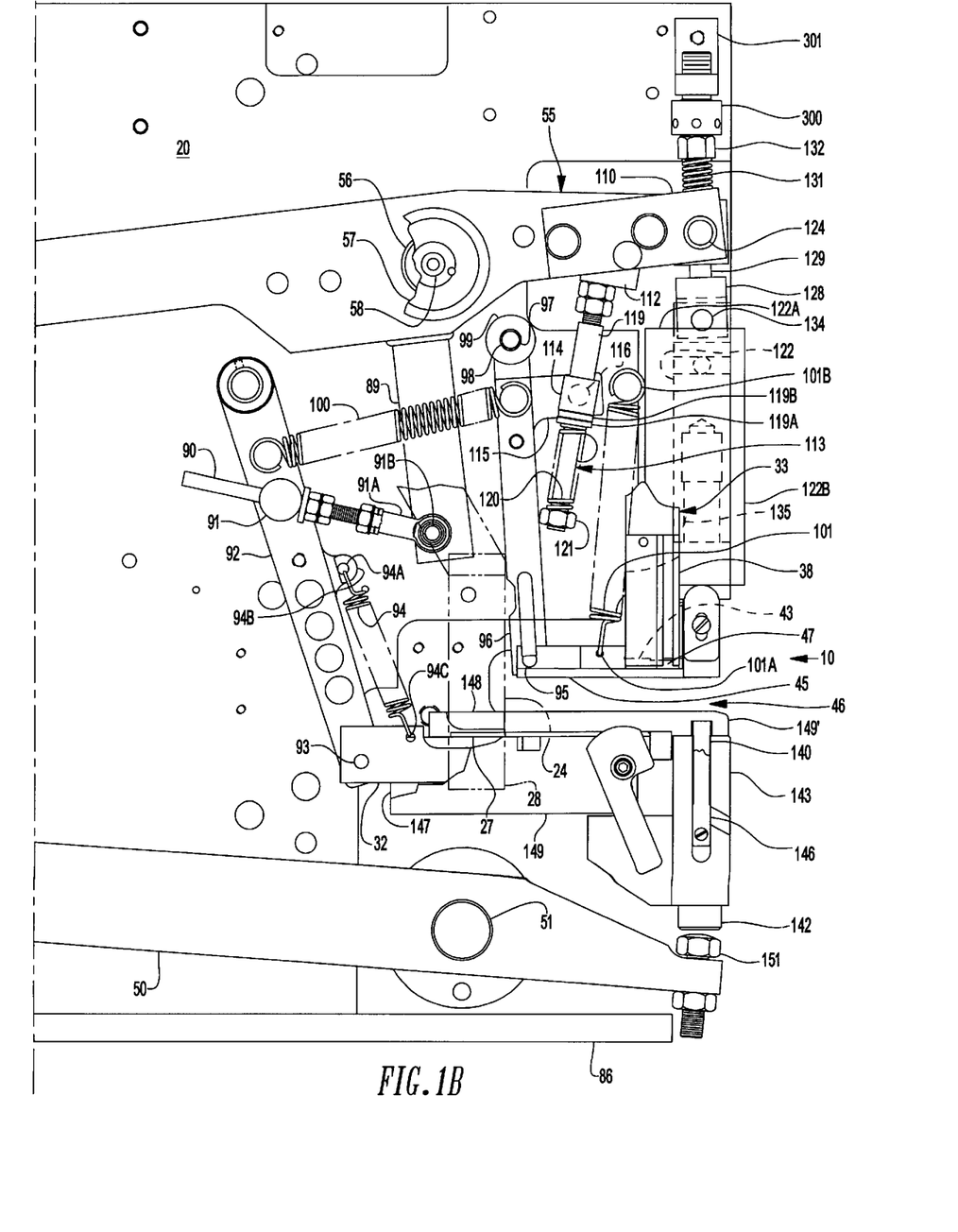
FIG. 1B is a side elevational view of the remainder of the attaching apparatus of FIG. 1A with the safety device of the present invention omitted.

Referring to the drawings and particularly FIGS. 1A and 1B, there is shown an attaching apparatus 10 for attaching two mating fastener elements such as a burr 11 (see FIG. 3) and a rivet 12, for example, to each other with a material 14 therebetween. The burr 11 has a cavity or recess 15 (see FIG. 4) to receive an elongated portion 16 (see FIG. 3) of the rivet 12 extending from a head 17 of the rivet 12 when the burr 11 and the rivet 12 are attached to each other.

It should be understood that the mating fastener elements may be other than the burr 11 and the rivet 12. For example, the mating fastener elements could be a button and a rivet or a post and a stud. The attaching apparatus 10 (see FIGS. 1A and 1B) is capable of attaching any two mating fastener elements to each other with the material 14 (see FIG. 3) therebetween.

The attaching apparatus 10 (see FIG. 1B) includes a plate-like support 20 preferably having two hoppers (not shown) mounted at its upper end. In a manner similar to that shown and described in U.S. Pat. No. 5,319,848 to Schmidt et al, which is incorporated by reference herein, a feed chute 24, which includes a substantially vertical rail and a pair of covers secured to the substantially vertical rail, extends between a first of the hoppers and a guide channel 27 to transport each of the rivets 12 (see FIG. 3) from the first hopper to the guide channel 27 (see FIG. 1B).

The feed chute 24 has a curved lower rail mount 28 (see FIG. 2) attached to the bottom end of the substantially vertical rail by screws with the covers having their bottom ends similarly connected to the curved lower rail mount 28. This arrangement enables transport of the rivets 12 (see FIG. 3) from the substantially vertical rail of the feed chute 24 (see FIG. 1B) to the guide channel 27. The upper end of the substantially vertical rail of the feed chute 24 communicates with the interior of the first hopper in the manner shown in the aforesaid Schmidt et al patent, for example, to transport each of the rivets 12 (see FIG. 3) from the first hopper to the space between the substantially vertical rail and the covers of the feed chute 24 (see FIG. 1B).

The guide channel 27 is particularly shown and described in U.S. Pat. No. 3,750,925 to Schmidt et al, which is incorporated by reference herein. The guide channel 27 aligns the elongated portion 16 (see FIG. 3) of the rivet 12 in the correct orientation as each of the rivets 12 is advanced through the guide channel 27 (see FIG. 1B) by a feed in finger or slide bar 32. The feed in finger 32 is reciprocated once during each cycle of operation of the attaching apparatus 10.

A second of the hoppers has the burrs 11 (see FIG. 3) therein. An upper feed chute 33 (see FIG. 1B) has its upper end supported by the second hopper for communication with the interior of the second hopper in the manner shown and described in the aforesaid Schmidt et al U.S. Pat. No. 5,319,848.

The upper feed chute 33 includes a rail and a cover attached to the rail by screws. The upper end of the upper feed chute 33 receives each of the burrs 11 (see FIG. 3) from the interior of the second hopper.

Figure 4:
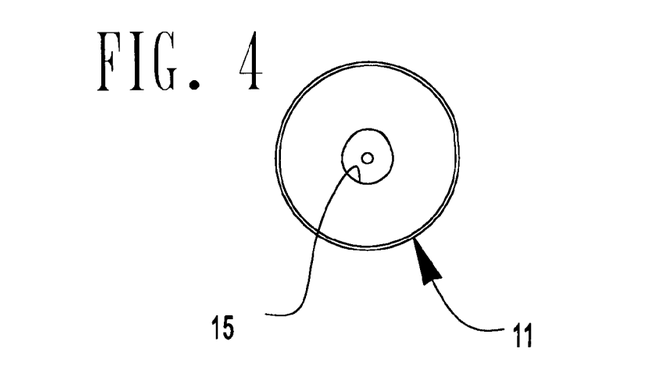
FIG. 4 is a plan view of one side of the burr of FIG. 3.
Figure 5:
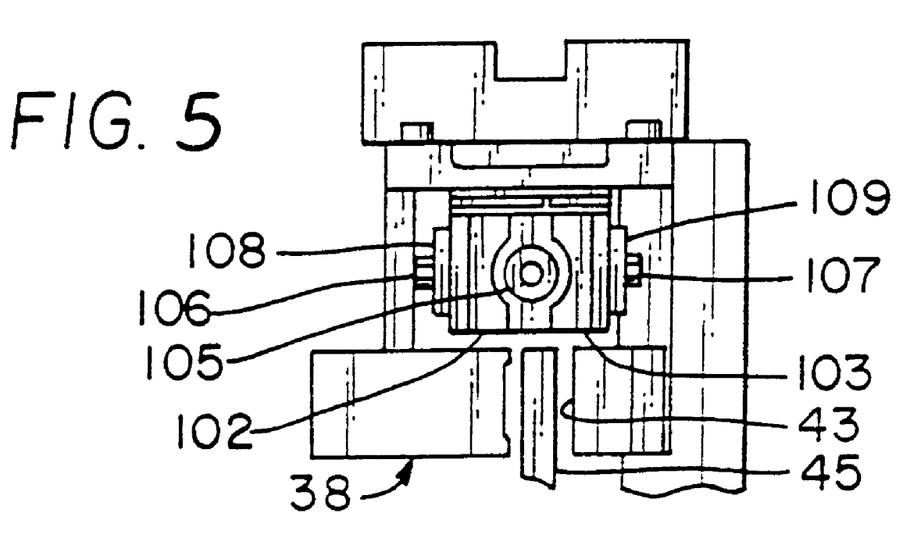
FIG. 5 is a fragmentary bottom plan view of a portion of the attaching apparatus of FIG. 1 and showing a guide channel within which each rivet enters a feed chute prior to the rivet being disposed at a setting station and a feed in finger disposed in the guide channel.

Each of the burrs 11 advances from the bottom end of the upper feed chute 33 (see FIG. 2) into a curved lower feed chute 38. The curved lower feed chute 38 includes a curved feed in rail having covers attached to its back and one of its sides to retain the burr 11 (see FIG. 3) within a groove in the rail. When the burr 11 exits from the curved lower feed chute 38 (see FIG. 2) to change from a vertical disposition when it entered the curved lower feed chute 38 to a horizontal position, the burr 11 (see FIG. 3) enters a horizontally disposed guide channel 43 (see FIG. 5) to orient the burr 11 (see FIG. 4) horizontally with the cavity or recess 15 in the burr 11 facing downwardly.

A feed in finger or slide bar 45 (see FIG. 5) reciprocates in the guide channel 43 between a position in which the lowermost of the burrs 11 (see FIG. 3) in the lower curved feed chute 38 (see FIG. 5) can enter the guide channel 43 to a position in which the burr 11 (see FIG. 3) is advanced in the guide channel 43 (see FIG. 1B) for disposition at a setting station 46. The advancement of the feed in finger 45 disposes a substantially horizontal portion 47, which is more particularly shown and described in the aforesaid Schmidt et al U.S. Pat. No. 5,319,848, of the feed in finger 45 to block the exit of the curved lower feed chute 38 (see FIG. 2) to prevent another of the burrs 11 (see FIG. 3) in the curved lower feed chute 38 (see FIG. 5) from entering the guide channel 43. The feed in finger 45 includes a vertical surface (not shown) to engage the burr 11 (see FIG. 3), which rests on a substantially horizontal surface (not shown) lower than the substantially horizontal portion 47 (see FIG. 1B) as shown and described in the aforesaid Schmidt et al U.S. Pat. No. 5,319,848, of the feed in finger 45 (see FIG. 1B), to advance the burr 11 (see FIG. 3) from the guide channel 43 (see FIG. 5). The feed in finger 45 is reciprocated once during each cycle of operation of the attaching apparatus 10 (see FIG. 1B).

During each cycle of operation of the attaching apparatus 10, there is pivotal motion of a lower power arm 50, which is pivotally mounted on a shoulder shaft 51 supported by the plate-like support 20. An E-ring (not shown) retains the lower power arm 50 on the shoulder shaft 51 through fitting in a groove in the end of the shoulder shaft 51.

During each cycle of operation, there also is pivotal movement of an upper power arm 55, which is pivotally mounted on a shoulder shaft 56 supported by the plate-like support 20. A cap 57, which is secured to the end of the shoulder shaft 56 by a screw 58 extending into a threaded hole in the end of the shoulder shaft 56, retains the upper power arm 55 on the shoulder shaft 56.

The lower power arm 50 is pivotally connected to a lower end bearing 59 (see FIG. 1A) of a push rod assembly 60. The push rod assembly 60 includes a retainer 60A having a lower threaded stud 60B threaded into a threaded hole (not shown) in the top of the lower end bearing 59. A nut 60C is retained in a desired position on the lower threaded stud 60B by a lock nut 60D to adjustably position the retainer 60A on the lower end bearing 59.

The upper end of the retainer 60A receives the lower end of a shaft 60E, which extends through a cap 60F. The cap 60F is threaded into a threaded hole (not shown) in the upper end of the retainer 60A. The shaft 60E has a key (not shown) in a keyway (not shown) for cooperation with a slot (not shown) in the cap 60F to prevent rotation of the shaft 60E.

A spring 60J surrounds the upper portion of the shaft 60E and has its bottom end acting against the top end of the cap 60F. Two jam nuts 60K and 60L are threaded on the threaded upper portion of the shaft 60E and the bottom jam nut 60K has the upper end of the spring 60J acting thereagainst. A lock washer 60M holds the top jam nut 60L in position.

The shaft 60E has its threaded upper portion received in a threaded hole (not shown) of a base 61. The push rod assembly 60 is connected to a cam 62 through having the base 61 attached to the cam 62 by a stud 63 extending through the base 61 and having its threaded end threaded into a threaded hole (not shown) in the cam 62.

The cam 62 is fixed to one end of a shaft 65, which makes one revolution during each cycle of operation of the attaching apparatus 10. The shaft 65 is rotatably supported on the plate-like support 20 through a bearing (not shown).

The shaft 65 is rotated when a one revolution clutch such as a one revolution wrap spring solenoid clutch 67 (see FIG. 6) is activated, for example, to connect the shaft 65 to a continuously rotating flywheel 68. The flywheel 68 is secured to a flange 69 on one end of a cylindrical portion of the clutch 67 extending from a plate 71 of the clutch 67. The plate 71 is mounted on the plate-like support 20.

Figure 6:
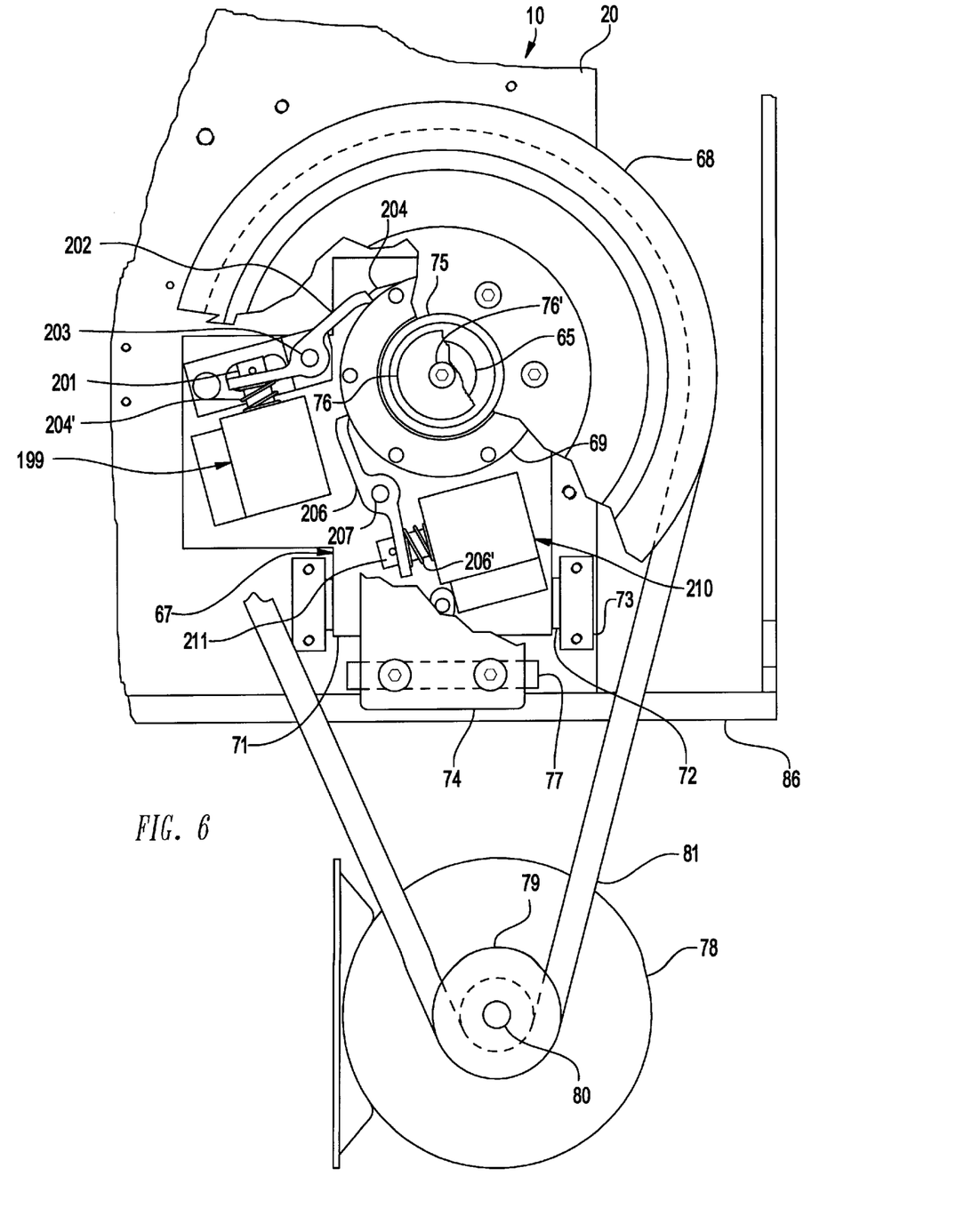
FIG. 6 is a fragmentary elevational view of a driving arrangement for controlling rotation of a cam during each cycle of operation of the apparatus.

The clutch 67 has a cylindrical portion (not shown) disposed within aligned holes (not shown) in the plate 71 and the plate-like support 20 with the cylindrical portion receiving the shaft bearing. The clutch 67 is prevented from rotating by the plate 71 being disposed between two rubber bumpers 72, which are retained within metal retainers 73 secured to the plate-like support 20.

The shaft 65 is rotatably supported in a holder 74 by a bearing 75. A cap 76 is secured to the end of the shaft 65 by a screw 76' extending through a hole in the cap 76 into a threaded hole in the end of the shaft 65. The cap 76 holds the cam 62 (see FIG. 1A) in the desired position. The holder 74 (see FIG. 6) is attached to a mount 77, which is mounted on the plate-like support 20.

The flywheel 68 is continuously rotated by a continuously rotating electric motor 78. The motor 78 has a pulley 79 mounted on its shaft 80. A belt 81 connects the pulley 79 and the flywheel 68.

The motor 78 is supported on a plate (not shown). The plate has an attached block (not shown) at its upper end supported on the bottom of a support plate (not shown) at the top of a vertical standard (not shown), which is supported by a base pedestal (not shown) through an adjustable sleeve (not shown). The support plate is attached to a base plate 86, which is secured to the plate-like support 20 and has the plate-like support 20 extending upwardly therefrom.

A spring 87 (see FIG. 1A) continuously urges the upper power arm 55 counterclockwise about the shoulder shaft 56 (see FIG. 1B) to maintain a cam follower 88 (see FIG. 1A), which is a bearing or roller, on the upper power arm 55 in continuous engagement with a profile or contour of the cam 62. Therefore, the movement of the upper power arm 55 is controlled by the profile or contour of the cam 62 during rotation of the cam 62.

Each of the feed in fingers 32 (see FIG. 1B) and 45 is reciprocated by motion of the upper power arm 55. The upper power arm 55 includes a downwardly extending portion 89 having its lower end pivotally connected to one end of a rod 90 through a rod end bearing 91A and a screw 91B. The rod 90 has its other end connected through a block 91 to a feed arm 92.

The feed arm 92 has its lower end pivotally connected by a screw 93 to one end of the feed in finger 32. A spring 94 extends from a hole 94A in an ear 94B of the feed arm 92 to a hole 94C in the feed in finger 32. The spring 94 continuously urges the feed in finger 32 upwardly counterclockwise about the pivot screw 93 during its reciprocation so that the feed in finger 32 is always positioned to engage the rivet 12 (see FIG. 3).

The feed in finger 45 (see FIG. 1B) is pivotally connected by a pivot pin 95 to the lower end of a lever 96. The lever 96 has its upper end pivotally mounted on the plate-like support 20 by a pivot pin 97 extending from the plate-like support 20 through a bushing 98 in a cylindrical bearing 99 of the lever 96. An E-ring (not shown) is disposed in a groove (not shown) in the pivot pin 97 to connect the lever 96, which is connected to the feed arm 92 by a spring 100, to the pivot pin 97.

A spring 101 has its lower end disposed in a hole 101A in the feed in finger 45 and its upper end connected to a stud 101B in the plate-like support 20. The spring 101 continuously urges the feed in finger 45 upwardly so that the substantially horizontal portion 47 is always held against the top of the guide channel 43 (see FIG. 5).

When the feed in finger 45 (see FIG. 1B) is advanced, the burr 11 (see FIG. 3) is advanced by the feed in finger 45 (see FIG. 1B) between two side plates 102 (see FIG. 2) and 103, which are mounted on a plunger 104 having a die 105 retained in its bottom end by a set screw 105'. The side plates 102 and 103 are mounted on the plunger 104 through a bolt 106 passing through the side plate 102, an elongated slot (not shown) in the plunger 104, and the side plate 103. The bolt 106 cooperates with a nut 107 to retain the side plates 102 and 103 on the plunger 104.

Figure 2:
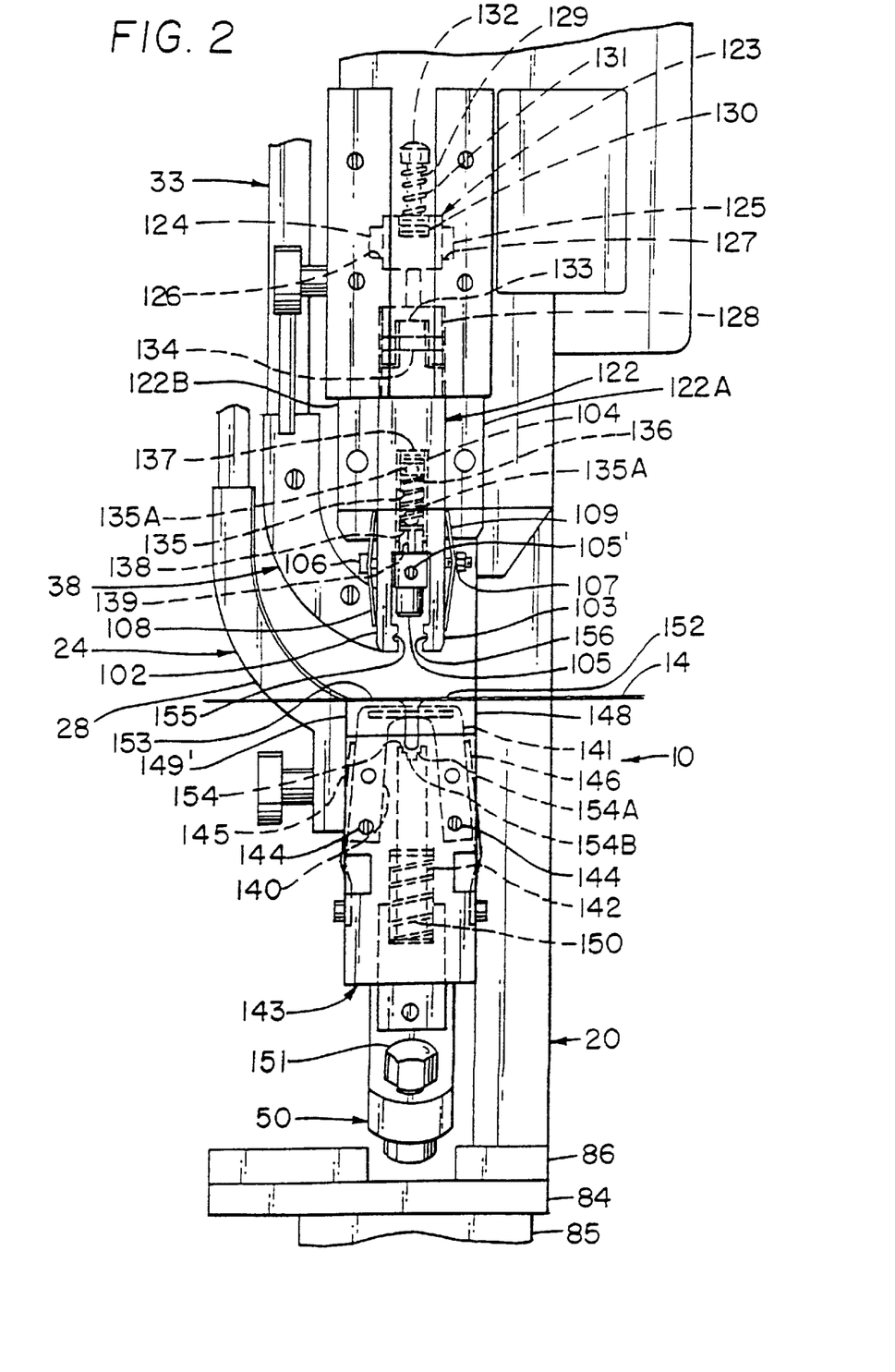
FIG. 2 is a fragmentary front end elevational view of the attaching apparatus of FIG. 1 without the safety device.

A spring 108 is disposed on the bolt 106 between the head of the bolt 106 and the side plate 102, and a spring 109 is disposed on the bolt 106 between the side plate 103 and the nut 107. The springs 108 and 109 enable the side plates 102 and 103 to separate slightly from each other to cease to hold the burr 11 (see FIG. 3) when the burr 11 and the rivet 12 are attached to each other and to the material 14.

The upper power arm 55 (see FIG. 1B) has a pair of brackets (one shown at 110) on opposite sides thereof and attached thereto adjacent one end thereof. A block 112 is retained between the two brackets 110 beneath the upper power arm 55.

A rod 113, which has its upper and lower ends threaded, has its upper end threaded into a threaded hole (not shown) in the lower end of the block 112. The rod 113 has its lower end extend through a passage (not shown) in a swivel 114.

An L-shaped bracket 115, which is attached to the lever 96, has a cylindrical pivot portion 116 of the swivel 114 pass through an opening (not shown) in the bracket 115 and retained therein by an E-ring (not shown) being disposed in a groove (not shown) in the cylindrical pivot portion 116. A sleeve 119 extends upwardly from the bottom of the swivel 114 through the passage in the swivel 114 to have the rod 113 pass therethrough. The sleeve 119 has its head 119A hold a washer 119B against the bottom of the swivel 114.

The rod 113 extends through an overtravel spring 120 beneath the swivel 114 to enable a nut 121 to be attached to the bottom threaded end of the rod 113. Thus, motion of the upper power arm 55 is transmitted to the lever 96 through the rod 113, the swivel 114, and the bracket 115 whereby the feed in finger 45 is reciprocated through pivoting of the lever 96 about the axis of the pivot pin 97.

As previously mentioned, the downwardly extending portion 89 of the upper power arm 55 is connected to the feed arm 92 for causing reciprocation of the feed in finger 32. Pivoting of the upper power arm 55 causes pivoting of the feed arm 92 to reciprocate the feed in finger 32. Accordingly, each of the feed in fingers 32 and 45 is reciprocated in each direction once during each cycle of operation of the attaching apparatus 10 because of pivotal movement of the upper power arm 55.

The feed in finger 32 is moved outwardly during the first half of each cycle of operation and inwardly during the second half of each cycle of operation. The feed in finger 45 is moved inwardly at the end of each cycle of operation and outwardly at the start of each cycle of operation.

The upper power arm 55 also is connected to a ram 122 for causing axial motion of the ram 122, which is slidably disposed within a housing 122A supported by the plate-like support 20 and having a cover 122B attached thereto, in both directions. This connection includes a pivot block 123 (see FIG. 2) having pivot pins 124 and 125 extending from opposite sides thereof for disposition in openings 126 and 127 in the two brackets 110 (one shown in FIG. 1B) on the upper power arm 55 to pivotally support the pivot block 123 (see FIG. 2) on the upper power arm 55 (see FIG. 1B).

The pivot block 123 (see FIG. 2) supports a clevis 128 through the clevis 128 having a threaded rod 129 on its upper end extending through a passage (not shown) in the pivot block 123. An overtravel spring 131 surrounds the threaded rod 129 between a cap nut 132 on the end of the threaded rod 129 and the pivot block 123. Thus, the clevis 128 is resiliently connected to the pivot block 123. The clevis 128 is connected to the ram 122 through the ram 122 having its reduced upper end 133 connected by a shaft 134 to the clevis 128.

The ram 122 has an elongated recess 135 extending inwardly from its bottom end to receive the plunger 104. The plunger 104 is connected to the ram 122 by two set screws 135A engaging two flats (not shown) on the plunger 104.

The plunger 104 has a spring 136 disposed therein with one end of the spring 136 engaging a screw 137 at the upper end of the plunger 104. The other end of the spring 136 engages a head 138 of a pin 139, which engages the bolt 106. Therefore, downward movement of the ram 122 by the upper power arm 55 (see FIG. 1B) causes the die 105 (see FIG. 2) to be moved downwardly.

The rivet 12 (see FIG. 3) is held in position by a pair of pivotally mounted jaws 140 (see FIG. 2) and 141 gripping the elongated portion 16 (see FIG. 3) of the rivet 12. When a holder 142 (see FIG. 2) is moved upwardly, the elongated portion 16 (see FIG. 3) of the rivet 12 is moved upwardly out of gripping engagement by the jaws 140 (see FIG. 2) and 141. The holder 142 is moved upwardly by pivotal movement of the lower power arm 50 during each cycle of operation of the attaching apparatus 10.

Each of the jaws 140 and 141 is pivotally mounted on an anvil block 143 by a screw 144. Springs 145 and 146, which are mounted on the anvil block 143, continuously urge the jaws 140 and 141, respectively, towards each other.

The anvil block 143 is supported on the plate-like support 20. A rail 147 (see FIG. 1B), which has the guide channel 27 along which the rivet 12 (see FIG. 3) is moved by the feed in finger 32 (see FIG. 1B), is supported by the anvil block 143 through a cover 148. The rail 147 has a rail 149, which is supported by the anvil block 143 through a cover 149' (see FIG. 2), for cooperation therewith to define a passage therebetween through which the rivet 12 (see FIG. 3) is advanced along the guide channel 27 (see FIG. 1B) by the feed in finger 32.

A spring 150 (see FIG. 2) surrounds the holder 142 and continuously urges the holder 142 towards an extending screw 151 on the lower power arm 50 at its remote end from the lower end bearing 59 (see FIG. 1A). The screw 151 (see FIG. 1B) lifts the holder 142 during pivotal motion of the lower power arm 50 in each cycle of operation of the attaching apparatus 10. Pivotal motion of the lower power arm 50 is due to the harmonic motion of the push rod assembly 60 (see FIG. 1A), which functions as a crank arm, created by rotation of the cam 62.

When the ram 122 (see FIG. 2) and the attached plunger 104 are moved downwardly, the side plates 103 and 102 engage the material 14 to hold the material 14 against upper surfaces 152 and 153, respectively, of the covers 148 and 149', respectively. As the holder 142 is moved upwardly against the force of the spring 150 when the lower power arm 50 pivots to move the screw 151 into engagement with the holder 142, a top surface 154 of the holder 142 receives the head 17 (see FIG. 3) of the rivet 12 and the jaws 140 (see FIG. 2) and 141 are cammed out of engagement with the elongated portion 16 (see FIG. 3) of the rivet 12 by the upward movement of the holder 142 (see FIG. 2). The holder 142 has the top surface 154 formed to receive and hold the head 17 (see FIG. 3) of the rivet 12 with the elongated portion 16 extending upwardly and gripped by the pair of pivotally mounted jaws 140 (see FIG. 2) and 141.

Figure 3:
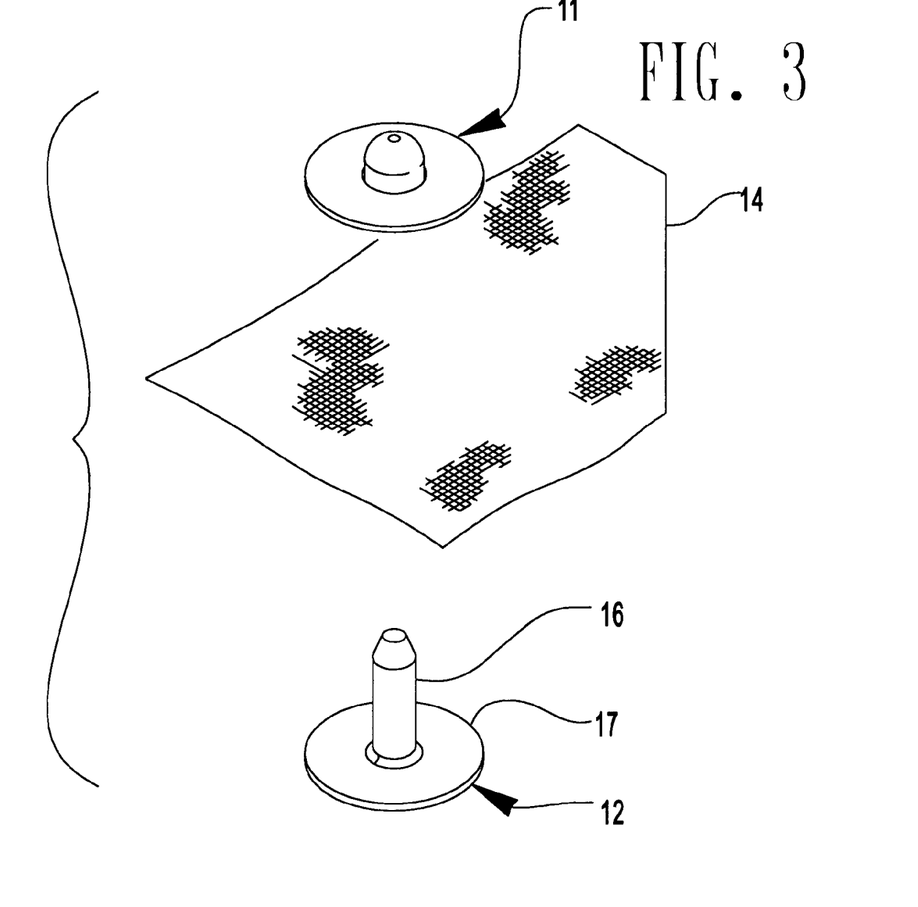
FIG. 3 is a perspective view of a rivet, a burr to which the rivet is to be attached, and material through which the rivet passes when the rivet and the burr are attached to each other by the attaching apparatus of FIG. 1.

As the holder 142 is moved upwardly, the elongated portion 16 (see FIG. 3) of the rivet 12 enters the cavity or recess 15 (see FIG. 4) in the burr 11 after passing through the material 14 (see FIG. 3). Each of the side plates 102 (see FIG. 2) and 103 has a surface 155 and 156, respectively, to receive an arcuate part of the bottom circular periphery of the burr 11 (see FIG. 3).

As the ram 122 (see FIG. 2) and the plunger 104 are moved downwardly, the guide plates 103 and 102 are prevented from further movement because of engagement with the upper surfaces 152 and 153, respectively, of the covers 148 and 149', respectively. However, the ram 122 and the plunger 104 can continue to move because the side plates 102 and 103 are resiliently connected to the plunger 104. The resilient connection includes the spring 136.

As the plunger 104 moves downwardly relative to the side plates 102 and 103, the die 105 engages the burr 11 (see FIG. 3) to move the bottom of the burr 11 towards the material 14 (see FIG. 2) and the upper surfaces 152 and 153 of the covers 148 and 149', respectively. Thus, the die 105 is supporting the burr 11 (see FIG. 3) when the holder 142 (see FIG. 2) moves upwardly to move the elongated portion 16 (see FIG. 3) of the rivet 12 into the cavity or recess 15 (see FIG. 4) in the burr 11. This causes deformation of the elongated portion 16 (see FIG. 3) of the rivet 12 within the cavity or recess 15 (see FIG. 4) in the burr 11. It should be understood that downward movement of the die 105 (see FIG. 2) and the burr 11 (see FIG. 3) ceases before deformation of the elongated portion 16 of the rivet 12 begins.

The springs 108 (see FIG. 2) and 109 enable the side plates 102 and 103 to separate slightly from each other to cease to hold the burr 11 (see FIG. 3).

The attaching apparatus 10 (see FIG. 7) includes a safety guard 160 to protect the extremities of the operator from injury during a cycle of operation of the attaching apparatus 10. The safety guard 160 includes a vertically movable slide 161, which is disposed within a recess 162 in the cover 122B of the ram 122.

Figures 7, 8, 9:
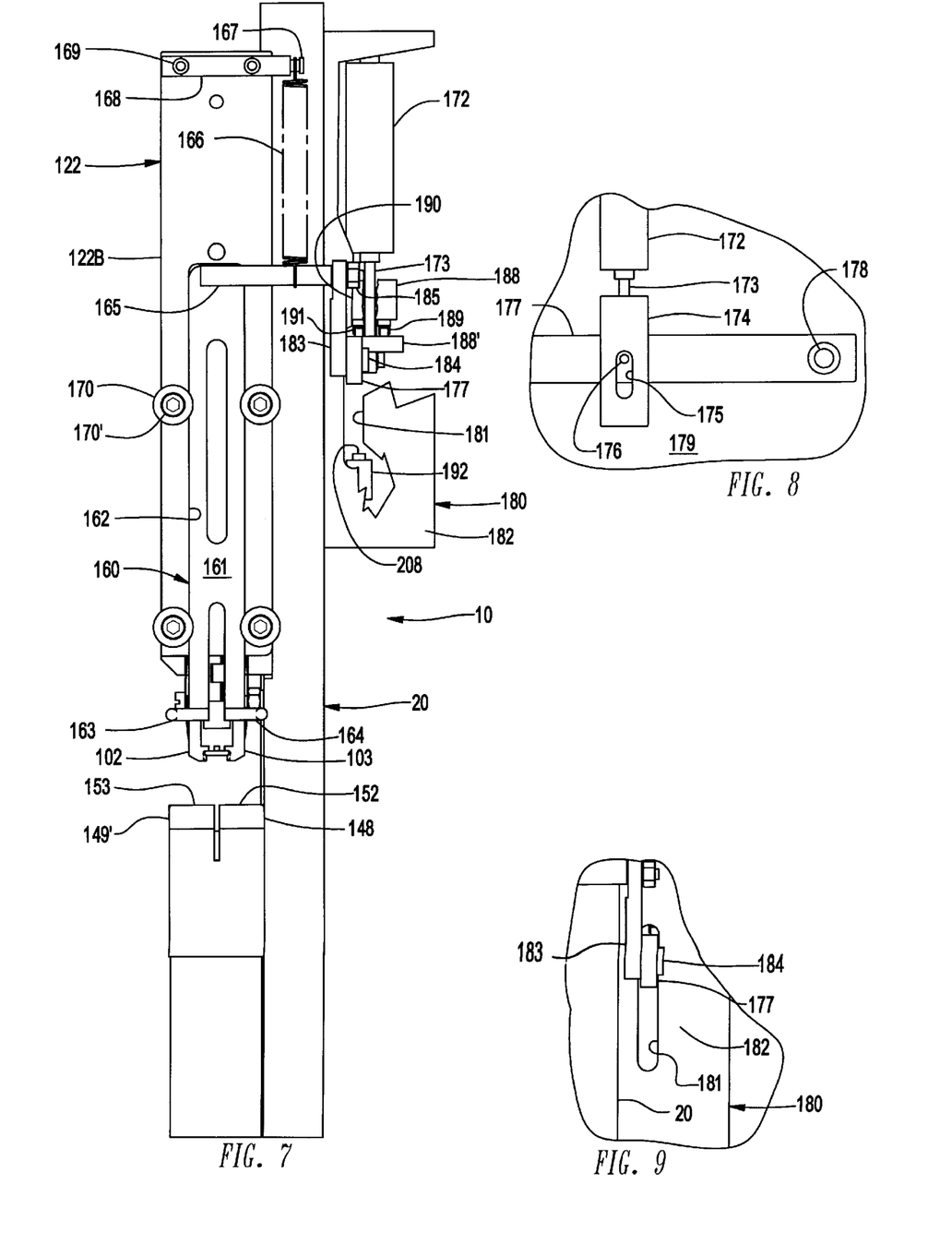
FIG. 7 is a fragmentary front end elevational view of the attaching apparatus of FIG. 1 and showing the safety device of the present invention.
FIG. 8 is a fragmentary side elevational view of a portion of the safety device of FIG. 7.
FIG. 9 is a fragmentary front end elevational view of a portion of the safety device of FIG. 7.

The slide 161 has a pair of guard rails 163 and 164 extending transversely from its bottom end. The guard rails 163 and 164 are positioned to engage any extremities (fingers and/or thumbs) of the operator disposed in an area in which they can be injured by the downward force of the ram 122 causing the bottoms of the side plates 103 and 102 to abut against the top surfaces 152 and 153, respectively, of the covers 148 and 149', respectively.

The slide 161 has a rod 165 fixed thereto adjacent its upper end and extending transversely thereof. A spring 166 has its bottom end connected to the rod 165 and its upper end connected to a screw 167 extending from a cross member 168. The cross member 168 is fixed to the cover 122B of the ram 122 by screws 169. Thus, the spring 166 continuously urges the vertically movable slide 161 to its uppermost position.

The slide 161 is contained within the recess 162 in the ram cover 122B by washers 170. The washers 170 overlap the slide 161 and are attached to the ram cover 122B by screws 170'.

Each cycle of operation of the apparatus 10 is started by an operator of the attaching apparatus 10 depressing a foot pedal switch 171 (see FIG. 10) to close the foot pedal switch 171. This initially causes downward motion of the safety guard 160 (see FIG. 7) against the force of the spring 166.

If no extremity of the operator is engaged by the guard rails 163 and 164 on the slide 161 before the slide 161 reaches its lowermost position, this absence of any extremity of the operator insures that the cycle of the operation may be safely continued. Thus, when the guard rails 163 and 164 on the bottom end of the slide 161 do not engage any obstacle to their downward motion, the cycle of operation of the attaching apparatus 10 continues.

Downward motion of the slide 161 is obtained through a pulse of compressed air being supplied to the top of an air cylinder 172 (see FIG. 7) to urge its piston rod 173 downwardly. An extension 174 (see FIG. 8) at the bottom of the piston rod 173 has a vertical slot 175 to receive a stud 176 on a pivotally mounted safety arm 177. The safety arm 177 is pivotally mounted by a pivot pin 178 extending from a rear wall 179 of a box 180 (see FIG. 7). The box 180 is supported on the plate-like support 20.

The box 180 has a vertical slot 181 (see FIG. 9) in a side wall 182 through which the safety arm 177 extends for connection to a linking lever 183 to which the safety arm 177 is connected by a screw 184. The linking lever 183 (see FIG. 7) is retained on a threaded end of the rod 165 by a nut 185.

Accordingly, when the piston rod 173 is extended from the air cylinder 172 by the pulse of compressed air supplied to the top of the air cylinder 172, the safety arm 177 pivots about the pivot pin 178 (see FIG. 8) to pull the slide 161 (see FIG. 7) downwardly against the force of the spring 166.

Figure 10:
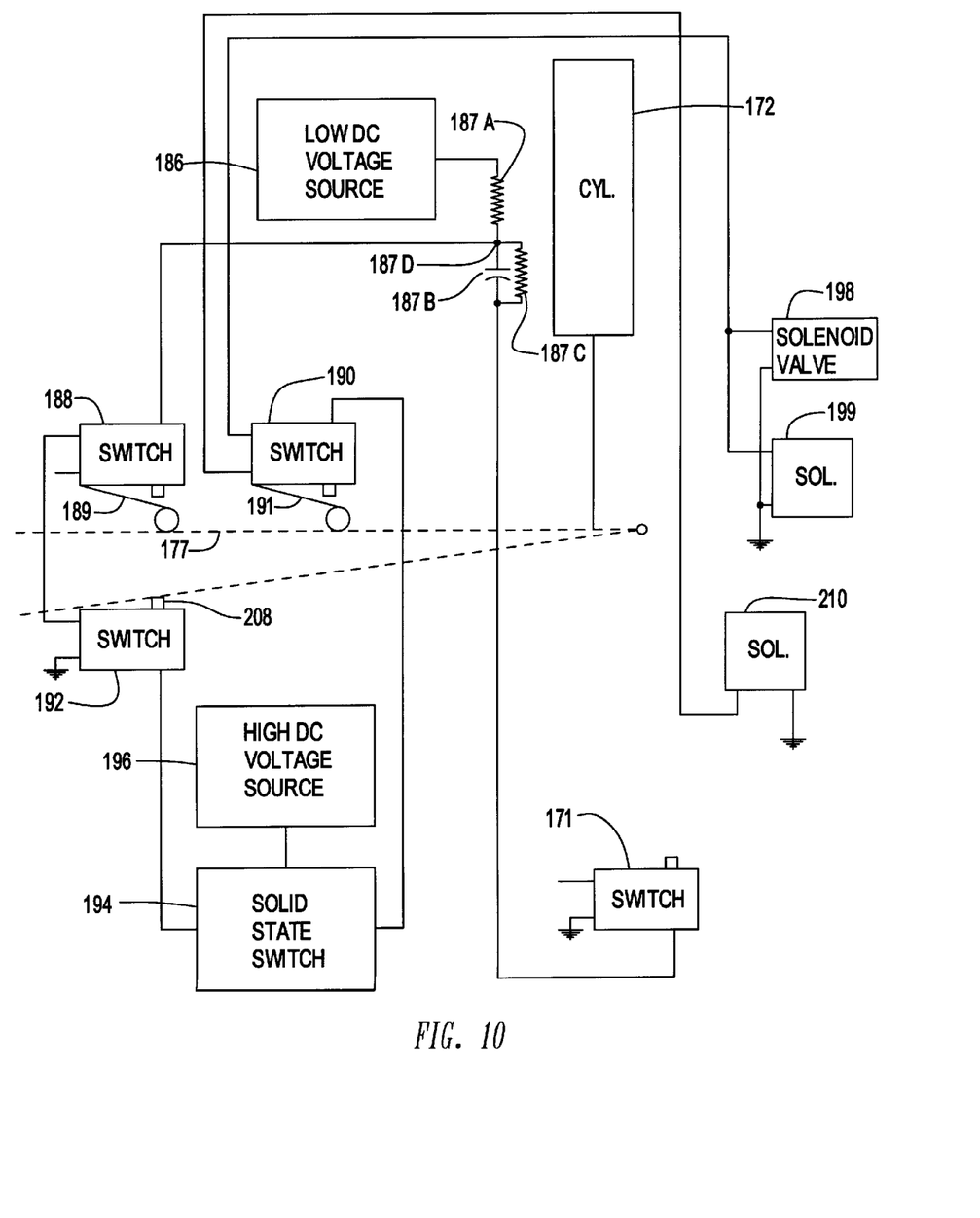
FIG. 10 is a schematic block diagram of an electrical control system for the safety device of the present invention.

The initiation of a cycle of operation of the attaching apparatus 10 is by closing the foot pedal switch 171 (see FIG. 10). This produces an electrical pulse signal for a short duration through connecting a ground at the closed foot pedal switch 171 to a low positive DC voltage source 186 through a resistor 187A and a capacitor 187B and a resistor 187C connected in parallel. The ground creates a voltage drop at a junction 187D of the resistor 187A and the parallel connected capacitor 187B and resistor 187C. The voltage drop, which ceases as soon as the capacitor 187B is charged, constitutes the pulse supplied through a switch 188 when the switch 188 is held in its closed position by the safety arm 177 (see FIG. 7) being in its uppermost or home position in which a block 188' on the safety arm 177 engages an activating arm 189 (see FIG. 10) of the switch 188, which is a microswitch.

A two-way switch 190, which is a microswitch, is disposed adjacent the switch 188 as shown in FIG. 7. The switch 190 also has its activating arm 191 (see FIG. 10) engaged by the block 188' (see FIG. 7) on the safety arm 177 when the safety guard 160 is in its uppermost or home position.

With the safety arm 177 in its home position, the voltage drop at the junction 187D (see FIG. 10) is supplied through the switch 188 and a two-way switch 192, which is a microswitch, as a signal to a solid state switch 194.

Because of the pulse constituting a lower voltage, the solid state switch 194, which is an FET, for example, conducts so that a high DC voltage source 196 is connected to the two-way switch 190. When the two-way switch 190 has its activating arm 191 engaged by the safety arm 177 (see FIG. 7), the high DC voltage from the high DC voltage source 196 (see FIG. 10) is supplied to the coil of each of a solenoid valve 198 and a solenoid 199.

The termination of the pulse at the junction 187D turns off the solid state switch 194 after a predetermined short period of time. Thus, the high DC voltage source 196 is only employed to turn on the solenoid valve 198 and the solenoid 199 with the short pulse.

Energization of the solenoid valve 198 causes a short pulse of pressurized air to be supplied to the top of the air cylinder 172 (see FIG. 7) to cause extension of the piston rod 173 to move the slide 161 downwardly. If the operator has an extremity in the danger or injury area, this will be detected or sensed by one of the guard rails 163 and 164 on the bottom of the slide 161 engaging the extremity.

This detection of the presence of an extremity of the operator in the danger or injury area stops the slide 161 so that it cannot reach its lowermost position. As a result, when the pressurized air ceases to be effective after the short pulse from the high DC voltage source 196 (see FIG. 10) is stopped by the termination of the pulse at the junction 187D so that the solenoid valve 198 returns to the position in which the pressurized air is exhausted from the air cylinder 172, the spring 166 (see FIG. 7) returns the slide 161 to its uppermost position while the piston rod 173 is retracted due to a spring (not shown) in the air cylinder 172. Accordingly, the cycle of operation cannot continue if the slide 161 does not reach its lowermost position.

Energization of the solenoid 199 (see FIG. 10) simultaneously with the solenoid valve 198 causes its plunger 201 (see FIG. 6) to be drawn inwardly to pivot a lever 202 counterclockwise about a pivot pin 203 extending from the plate 71. This pivoting of the lever 202 withdraws its end from holding engagement with a stop 204 on a control collar of the clutch 67. The lever 202 is biased clockwise into engagement with the stop 204 by a spring 204'.

This disengagement of the end of the lever 202 from the stop 204 allows the shaft 65 and the stop 204 to be rotated counterclockwise by the flywheel 68 until the stop 204 engages the end of a pivotally mounted lever 206, which is biased clockwise by a spring 206'. The lever 206 is pivotally mounted on a pivot pin 207 extending from the plate 71. Thus, there is only a slight amount of rotation of the shaft 65 with the flywheel 68 because of the clutch 67 being engaged until rotation of the shaft 65 is again stopped.

If the vertical downward movement of the slide 161 (see FIG. 7) of the safety guard 160 does not encounter any extremity of the operator in the danger or injury area, the slide 161 reaches its lowermost position. As a result, the safety arm 177 engages a plunger 208 of the two-way switch 192.

Inward movement of the plunger 208 of the two-way switch 192 connects a ground (see FIG. 10) at the switch 192 to the solid state switch 194. Again, a high DC voltage pulse from the high DC voltage source 196 is applied through the two-way switch 190 to a solenoid 210. The two-way switch 190 switched from one state or switch condition to the other when the safety arm 177 (see FIG. 7) initially moved away from its uppermost or home position.

The ground at the two-way switch 192 (see FIG. 10) is disconnected as soon as the safety arm 177 (see FIG. 7) is moved away from the plunger 208. The two-way switch 190 (see FIG. 10) changes state or switch condition when the activating arm 191 is engaged by the safety arm 177 (see FIG. 7) reaching its uppermost or home position. This disconnects the solid state switch 194 (see FIG. 10) from the solenoid 210 although the high DC voltage ceased earlier when the safety arm 177 (see FIG. 7) moved away from the plunger 208.

Energization of the solenoid 210 (see FIG. 6), which is supported on the plate 71, causes its plunger 211 to be retracted so that the pivotally mounted lever 206 is pivoted counterclockwise about the pivot pin 207 to cease to engage the stop 204. As a result, the shaft 65 rotates through the remainder of the 360° revolution to complete the cycle of operation of the attaching apparatus 10.

The safety arm 177 (see FIG. 7) has only a very short contact with the plunger 208 of the two-way switch 192. Accordingly, the pulse produced by the ground through the two-way switch 192 because of the state of the switch 192 is only for a very short period of time. Therefore, the solenoid 210 is turned on and then off in a relatively short period of time.

This pulse is created in a different way than the pulse initially created through depressing the foot pedal switch 171 (see FIG. 10). However, the same result of a short pulse is obtained.

If the plunger 208 of the switch 192 is not engaged because of the operator having an extremity in the danger or injury area, another depression of the foot pedal 171 cannot cause any activation until after the safety arm 177 (see FIG. 7) returns to its uppermost or home position to close the switch 188 (see FIG. 10) and change the state or switch condition of the two-way switch 190. This is the only way that the pulse produced by another depression of the foot pedal switch 171 can start another cycle of operation.

Of course, the next cycle of operation, if the prior cycle of operation had the slide 161 not being able to reach its lowermost position, begins with activation of the solenoid valve 198 (see FIG. 10) and the solenoid 199 because it is necessary to initially move the slide 161 (see FIG. 7) downwardly to again determine whether an extremity of the operator is in the danger or injury area. If not, then the solenoid 210 (see FIG. 6) is energized, and the cycle of operation is completed.

Accordingly, each cycle of operation includes time for activating the air cylinder 172 (see FIG. 7) as part of the one revolution cycle of operation. If the cycle of operation is stopped because the slide 161 cannot reach its lowermost position due to the operator having an extremity in the danger or injury area, the next cycle can begin as soon as the safety arm 177 has returned to its uppermost or home position in which the switch 188 (see FIG. 10) is closed and the state of the switch 190 is changed. Accordingly, a significant time period is saved with the safety guard 160 of the present invention.

Considering the operation of the attaching apparatus 10 (see FIG. 1B), the feed chute 24 is substantially filled from the first hopper with the rivets 12 (see FIG. 3). The upper feed chute 33 (see FIG. 2) and the curved lower feed chute 38 are substantially filled with the burrs 11 (see FIG. 3) from the second hopper.

The cycle of operation of the attaching apparatus 10 (see FIGS. 1A and 1B) begins with the foot pedal switch 171 (see FIG. 10) being activated. This closing of the foot pedal switch 171 initially causes rapid downward movement of the safety guard 160 (see FIG. 7) to determine if the operator has any extremity in the danger or injury area. If so, there is only the slight rotation of the shaft 65 (see FIG. 6) through connection to the flywheel 68 therewith until rotation is stopped by engagement of the stop 204 with the end of the lever 206.

If the operator does not have any extremity in the danger or injury area so that the safety arm 177 (see FIG. 7) can move to its lowermost position, then the end of the lever 206 (see FIG. 6) is pivoted away from engagement with the stop 204 and the cam shaft 65 and the attached cam 62 (see FIG. 1A) rotate through the remainder of the revolution to complete the cycle of operation. The cam shaft 65 is automatically stopped at the end of each revolution because of the stop 204 (see FIG. 6) engaging the end of the lever 202.

Rotation of the cam 62 (see FIG. 1A) causes the upper power arm 55 to begin to pivot through a rising first portion of the profile or contour of the cam 62 engaging the cam follower 88 on the upper power arm 55 to cause the upper power arm 55 to pivot clockwise. During the initial pivoting of the upper power arm 55, the feed in finger 45 (see FIG. 1B) is moved away from the setting station 46.

It should be understood that the ram 122 is held at a fixed position at the end of each cycle of operation through the cap nut 132 on the upper end of the threaded rod 129 engaging a fixed stop 300 adjustably supported on a bracket 301, which is fixed to the plate-like support 20. After the feed in finger 45 is moved away from the setting station 46 at the start of a cycle of operation of the attaching apparatus 10, the ram 122 is moved downwardly by the pivotal movement of the upper power arm 55.

During the first 180° of rotation of the cam shaft 65 (see FIG. 6), the feed in finger 32 (see FIG. 1B) is withdrawn from the setting station 46. This withdrawal of the feed in finger 32 enables another of the rivets 12 (see FIG. 3) to enter the guide channel 27 (see FIG. 1B) from the curved lower rail mount 28.

During the second 180° of rotation of the cam shaft 65 (see FIG. 6), the feed in finger 32 (see FIG. 1B) feeds one of the rivets 12 (see FIG. 3) to the setting station 46 (see FIG. 1B).

When the ram 122 moves down, the die 105 (see FIG. 2), which is carried by the plunger 104 attached to the ram 122, engages the burr 11 (see FIG. 3). This exerts a force on the burr 11 to move the burr 11 towards the rivet 12.

After the ram 122 (see FIG. 1B) has almost completed its downward motion, the holder 142 is lifted upwardly due to pivoting of the lower power arm 50, which is under control of the cam 62 (see FIG. 1A) through the push rod assembly 60 connecting the lower power arm 50 to the cam 62. Engagement of the screw 151 (see FIG. 1B) on the lower power arm 50 with the bottom of the holder 142 does not begin until pivoting of the lower power arm 50 has begun. Thus, the holder 142 does not begin upward movement until after the ram 122 starts down. The position of the screw 151 in the lower power arm 50 is adjustable to control when movement of the holder 142 by the lower power arm 50 starts during each cycle of operation.

After downward motion of the ram 122 is stopped by a constant second portion of the profile or contour of the cam 62 (see FIG. 1A) ceasing to move the upper power arm 55, the upper power arm 55 is held in its stopped position by the constant second portion of the profile or contour of the cam 62 so that the ram 122 (see FIG. 1B) is held in its stopped position as the cam 62 (see FIG. 1A) continues to rotate. Further upward movement of the holder 142 (see FIG. 1B) moves the elongated portion 16 (see FIG. 3) of the rivet 12 into the cavity or recess 15 (see FIG. 4) in the burr 11 after the elongated portion 16 (see FIG. 3) of the rivet 12 passes through the material 14.

Continued rotation of the cam shaft 65 (see FIG. 6) results in the lower power arm 50 (see FIG. 1A) being pivoted by the connection of the cam 62 to the lower power arm 50 through the push rod assembly 60 to allow the spring 150 (see FIG. 2) to return the holder 142 to a position in which the jaws 140 and 141 are no longer held apart. This disposes the jaws 140 and 141 to receive another of the rivets 12 (see FIG. 3) during the next cycle of operation of the attaching apparatus 10 (see FIG. 1B).

Continued rotation of the cam 62 (see FIG. 1A) causes a falling third portion of its cam profile or contour to engage the cam follower 88. As the cam follower 88 on the upper power arm 55 follows the falling third portion of the cam profile or contour of the cam 62, this results in the spring 87 pivoting the upper power arm 55 counterclockwise. The counterclockwise pivotal movement of the upper power arm 55 causes upward motion of the ram 122 and movement of the feed in finger 45 to advance another of the burrs 11 (see FIG. 3) through the guide channel 43 (see FIG. 5) to the setting station 46 (see FIG. 1B).

The feed in finger 32 also advances another of the rivets 12 (see FIG. 3) through the guide channel 27 (see FIG. 1B) to the setting station 46 during upward motion of the ram 122. The cycle ends with the ram 122 being held in a fixed position through the cap nut 132 on the upper end of the threaded rod 129 engaging the fixed stop 300 on the plate-like support 20.

The magnitude of the setting force on the rivet 12 (see FIG. 3) is determined by the force of the compression spring 60J (see FIG. 1A). If the compressive force of the spring 60J is increased, the force exerted by the lower power arm 50 on the holder 142 (see FIG. 1B) is increased to increase the setting force and vice versa. The compressive force of the spring 60J (see FIG. 1A) is adjusted by changing the position of the jam nut 60K on the threaded upper portion of the shaft 60E.

If the rivets 12 (see FIG. 3) are replaced with another type of fastener element, it may be necessary to replace the feed chute 24 (see FIG. 1B) and the curved lower rail mount 28 to conform to the configuration of the new type of fastener element. If the burrs 11 (see FIG. 3) are replaced with another type of fastener element, it may be necessary to replace the upper feed chute 33 (see FIG. 2) and the curved lower feed chute 38 to conform to the configuration of the new type of fastener element.

It should be understood that the die 105 must cease to move downward before deformation of the rivet 12 (see FIG. 3) begins. Thus, this ceasing of movement can be as late as when the elongated portion 16 of the rivet 12 enters the cavity 15 (see FIG. 4) of the burr 11 or as early as when the rivet 12 (see FIG. 3) begins its upward motion.

The safety guard 160 has been shown as utilized with the attaching apparatus 10 as the preferred embodiment. However, it should be understood that the safety guard 160 may be employed with any other suitable attaching apparatus.

It should be understood that it is not necessary to use the air cylinder 172 for downward movement of the slide 161. For example, a solenoid plunger could be utilized rather than the piston rod 173 of the air cylinder 172 to produce the motion of the safety arm 177 through which the slide 161 is moved downwardly.

An advantage of this invention is that it significantly decreases the time of a cycle of operation for an attaching apparatus having a device for checking whether an operator's extremities can be injured by moving portions of the attaching apparatus. Another advantage of this invention is that more cycles of operation of an attaching apparatus can be obtained in a given period of time while still insuring that no extremity of an operator is in an injury area.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

What is claimed is:

1. An attaching apparatus for attaching first and second mating fastener elements to material at a setting station including:

support means and ram means at the setting station;

first disposing means for disposing a first fastener element at the setting station in a specific orientation for engagement by one of said support means and said ram means;

second disposing means for disposing a second fastener element at the setting station in a specific orientation for engagement by the other of said support means and said ram means;

moving means for creating relative movement between said support means and said ram means to attach the first fastener element and the second fastener element to each other at the setting station;

activation control means for controlling movement of each of said ram means and said support means by said moving means during a cycle of operation of said attaching apparatus;

and control preventing means for preventing said moving means from moving said ram means into an area in which an extremity of an operator of said attaching apparatus will be struck by said ram means when the operator has an extremity in the area in which the extremity will be struck by said ram means during movement of said ram means including:

vertically movable engaging means for engaging an operator's extremity when the extremity is disposed in the area in which the extremity will be struck by said ram means during movement of said ram means;

causing means for causing movement of said vertically movable engaging means away from its home position at the start of each cycle of operation of said attaching apparatus to a detecting position to detect whether an extremity of the operator is in the area in which the extremity will be struck by said ram means during movement of said ram means;

return means for returning said vertically movable engaging means to its home position in which said vertically movable engaging means will not engage an operator's extremity when the extremity is disposed in the area in which the extremity will be struck by said ram means during movement of said ram means;

first preventing means for preventing said moving means from moving said ram means into the area in which the extremity will be struck by said ram means if said vertically movable engaging means engages an extremity of the operator in the area in which the extremity will be struck by said ram means during movement of said ram means;

and rendering means for rendering said first preventing means ineffective only after said first preventing means is effective to stop the cycle of operation before it is completed until said vertically movable engaging means is returned to its home position by said return means and another cycle of operation is started and said vertically movable engaging means does not engage an extremity of the operator in the area in which the extremity will be struck by said ram means during movement of said ram means.

2. The attaching apparatus according to claim 1 in which said causing means includes pneumatic means for moving said vertically movable engaging means away from its home position to the detecting position each time that a cycle of operation of said attaching apparatus is selected by the operator.

3. The attaching apparatus according to claim 2 in which said causing means includes limit means for limiting the time period during which said pneumatic means is effective so that said vertically movable engaging means is returned to its home position by said return means at the expiration of the time period.

4. The attaching apparatus according to claim 3 in which said rendering means includes means for sensing when said vertically movable engaging means returns to its home position after engaging the operator's extremity in the area in which the extremity will be struck by said ram means during movement of said ram means towards said support means.

5. The attaching apparatus according to claim 4 in which said return means includes urging means for continuously urging said vertically movable engaging means to its home position in which said vertically movable engaging means will not engage an operator's extremity when the extremity is disposed in the area in which the extremity will be struck by said ram means during movement of said ram means towards said support means.

6. The attaching apparatus according to claim 1 in which said return means includes urging means for continuously urging said vertically movable engaging means to its home position in which said vertically movable engaging means will not engage an operator's extremity when the extremity is disposed in the area in which the extremity will be struck by said ram means during movement of said ram means towards said support means.

7. The attaching apparatus according to claim 1 in which said rendering means includes means for sensing when said vertically movable engaging means returns to its home position after engaging the operator's extremity in the area in which the extremity will be struck by said ram means during movement of said ram means towards said support means.

8. The attaching apparatus according to claim 1 including:

starting means for starting each cycle of operation;

said starting means activating said causing means at the start of each cycle of operation;

and said starting means simultaneously activating said activation control means at the start of each cycle of operation when said activation control means is in its home position.

9. An attaching apparatus for attaching first and second mating fastener elements to material at a setting station including:

support means and ram means at the setting station;

first disposing means for disposing a first fastener element at the setting station in a specific orientation for engagement by one of said support means and said ram means;

second disposing means for disposing a second fastener element at the setting station in a specific orientation for engagement by the other of said support means and said ram means;

moving means for creating relative movement between said support means and said ram means to attach the first fastener element and the second fastener element to each other at the setting station;

said moving means including:
  driving means;
  and rotatable means driven by said driving means for creating relative movement between said support means and said ram means;

selective connecting means for selectively connecting said driving means to said rotatable means to start a cycle of operation of said attaching apparatus;

and said selective connecting means including:
  first holding means for holding said rotatable means at its home position;
  means for releasing said first holding means when a cycle of operation of said attaching apparatus is started;
  second holding means for holding said rotatable means at a position advanced from the home position after said releasing means is effective if an operator's extremity is in an area in which the operator's extremity will be struck by said ram means when said ram means is moved into the area in which the operator's extremity will be struck by said ram means;
  and means for rendering said second holding means ineffective in the next cycle of operation only if no operator's extremity is in an area in which the operator's extremity will be struck by said ram means when said ram means is moved into the area in which the operator's extremity will be struck by said ram means.

10. The attaching apparatus according to claim 9 in which said moving means includes:
  first causing means for causing movement of said ram means when said driving means creates movement of said first causing means through said rotatable means;
  and second causing means for causing movement of said support means when said driving means creates movement of said second causing means through said rotatable means.

11. The apparatus according to claim 9 in which:
  said driving means is a single power source;
  said single power source includes:
    an electric motor;
    and a flywheel continuously driven by said electric motor when said electric motor is energized;
  and said selective connecting means selectively connects said flywheel to said rotatable means.

12. An attaching apparatus for attaching first and second mating fastener elements to material at a setting station including:
  support means and ram means at the setting station;
  first disposing means for disposing a first fastener element at the setting station in a specific orientation for engagement by one of said support means and said ram means;
  second disposing means for disposing a second fastener element at the setting station in a specific orientation for engagement by the other of said support means and said ram means;
  moving means for creating relative movement between said support means and said ram means to attach the first fastener element and the second fastener element to each other at the setting station;
  activation control means for controlling activation of each of said ram means and said support means by said moving means during a cycle of operation of said attaching apparatus;
  control preventing means for preventing said moving means from moving said ram means into an area in which an extremity of an operator of said attaching apparatus will be struck by said ram means when the extremity is in the area in which the extremity will be struck by said ram means during movement of said ram means;
  said control preventing means including determining means for determining in an initial portion of each cycle of operation if an extremity of an operator of said attaching apparatus will be struck by said ram means when the extremity is in the area in which the extremity will be struck by said ram means during movement of said ram means;
  and said control preventing means including stopping means for stopping the cycle of operation before its completion after it is determined by said determining means that the operator's extremity is in the area in which the extremity will be struck by said ram means during movement of said ram means with said activation control means remaining in the position to which it has been moved prior to the cycle of operation being stopped before its completion by said stopping means.

13. The attaching apparatus according to claim 12 in which:
  said determining means of said control preventing means includes:
    vertically movable engaging means for engaging an operator's extremity when the extremity is disposed in the area in which the extremity will be struck by said ram means during movement of said ram means;
    causing means for causing movement of said vertically movable engaging means away from its home position at the start of each cycle of operation of said attaching apparatus to a detecting position to detect whether an extremity of the operator is in the area in which the extremity will be struck by said ram means during movement of said ram means;
    return means for returning said vertically movable engaging means to its home position in which said vertically movable engaging means will not engage an operator's extremity when the extremity is disposed in the area in which the extremity will be struck by said ram means during movement of said ram means;
    and first preventing means for preventing said moving means from moving said ram means into the area in which the extremity of the operator will be struck by said ram means if said vertically movable engaging means engages an extremity of the operator in the area in which the extremity will be struck by said ram means during movement of said ram means;
  and said stopping means of said control preventing means includes means for rendering said first preventing means ineffective only after said first preventing means is effective to stop the cycle of operation before its completion until said vertically movable engaging means is returned to its home position by said return means and another cycle of operation is started and said vertically movable engaging means does not engage an extremity in the area in which the extremity will be struck by said ram means during movement of said ram means.

14. The attaching apparatus according to claim 13 including:

starting means for starting each cycle of operation;

said starting means activating said causing means at the start of each cycle of operation;

and said starting means simultaneously activating said activation control means at the start of each cycle of operation when said activation control means is in its home position.

15. The attaching apparatus according to claim 12 including:

said control preventing means including:
first holding means for holding said activation control means at its home position only when the prior cycle of operation was not stopped prior to its completion;
and means for releasing said first holding means when a cycle of operation of said attaching apparatus is started;

and said stopping means of said control preventing means including:
second holding means for holding said activation control means at a position advanced from its home position a sufficient distance to enable determination by said determining means if the operator's extremity is in the area in which said ram means will strike the operator's extremity, said second holding means remaining effective at least until after said determining means has made a determination in the next cycle of operation when the prior cycle of operation was stopped prior to completion;
and means for preventing said second holding means from being rendered ineffective to enable said activation control means to complete a cycle of operation if it is determined by said determining means that an extremity of the operator is in the area in which the extremity will be struck by said ram means during movement of said ram means.

16. The attaching apparatus according to claim 12 including:

starting means for starting each cycle of operation;

said starting means activating said determining means at the start of each cycle of operation;

and said starting means simultaneously activating said activation control means at the start of each cycle of operation only when said activation control means is in its home position.

17. The attaching apparatus according to claim 12 including means for inactivating said stopping means of said control preventing means in the next cycle of operation after said stopping means of said control preventing means is effective if said determining means determines that an extremity of the operator is not in the area in which the extremity will be struck by said ram means during movement of said ram means.

* * * * *

UNITED STATES PATENT AND TRADEMARK OFFICE
CERTIFICATE OF CORRECTION

PATENT NO. : 6,148,504
DATED : November 21, 2000
INVENTOR(S) : Volker Schmidt et al It is certified that error appears in the above-identified patent and that said Letters Patent is hereby corrected as shown below:

Column 2, line 40, cancel "each other"
Column 2, line 41, after "to" insert --each other--
Column 2, line 42, should not be a new paragraph
Column 3, line 6, "ineffectively" should read --ineffective--
Column 3, line 27, cancel "a"
Column 3, line 38, cancel the comma "(,)"
Column 3, line 41, after "in" insert -- which --

Signed and Sealed this

First Day of May, 2001

Attest:

NICHOLAS P. GODICI

Attesting Officer

Acting Director of the United States Patent and Trademark Office